United States Patent [19]
Beck

[11] 3,713,547
[45] Jan. 30, 1973

[54] ENDLESS CABLE WAY FOR TRANSPORTING PIPE

[76] Inventor: Don D. Beck, Box 1369, Odessa, Tex. 79760

[22] Filed: Aug. 23, 1971

[21] Appl. No.: 173,861

[52] U.S. Cl. .................214/2.5, 104/112, 214/152
[51] Int. Cl. ...........................................E21b 19/14
[58] Field of Search ............214/13, 14, 3.1, 2.5, 1 P; 212/72; 104/112, 114

[56] References Cited

UNITED STATES PATENTS

| | | | |
|---|---|---|---|
| 890,306 | 6/1908 | Schmertz | 214/2.5 X |
| 3,589,299 | 6/1971 | Ingram | 214/13 |

FOREIGN PATENTS OR APPLICATIONS 255,331  11/1970  U.S.S.R. ................104/112

Primary Examiner—Gerald M. Forlenza
Assistant Examiner—Frank E. Werner
Attorney—Marcus L. Bates

[57] ABSTRACT

Method and apparatus for transporting pipe between spaced apart locations comprising an endless cable disposed in proximity of the two locations and provided with pipe receiving carriages, one of which is attached to and moves with the cable. When longitudinal motion is imparted into the cable, the carriages move from one location to the other carrying the pipe therewith. The cable can be slackened to vertically move the carriages so as to enable the pipe to be placed within or removed from the carriages.

16 Claims, 14 Drawing Figures

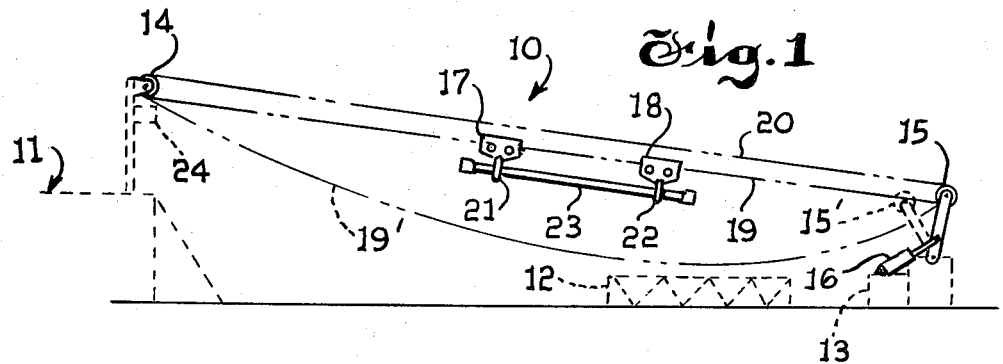
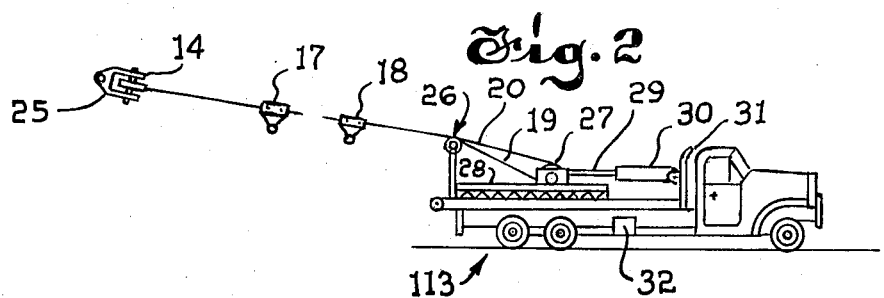
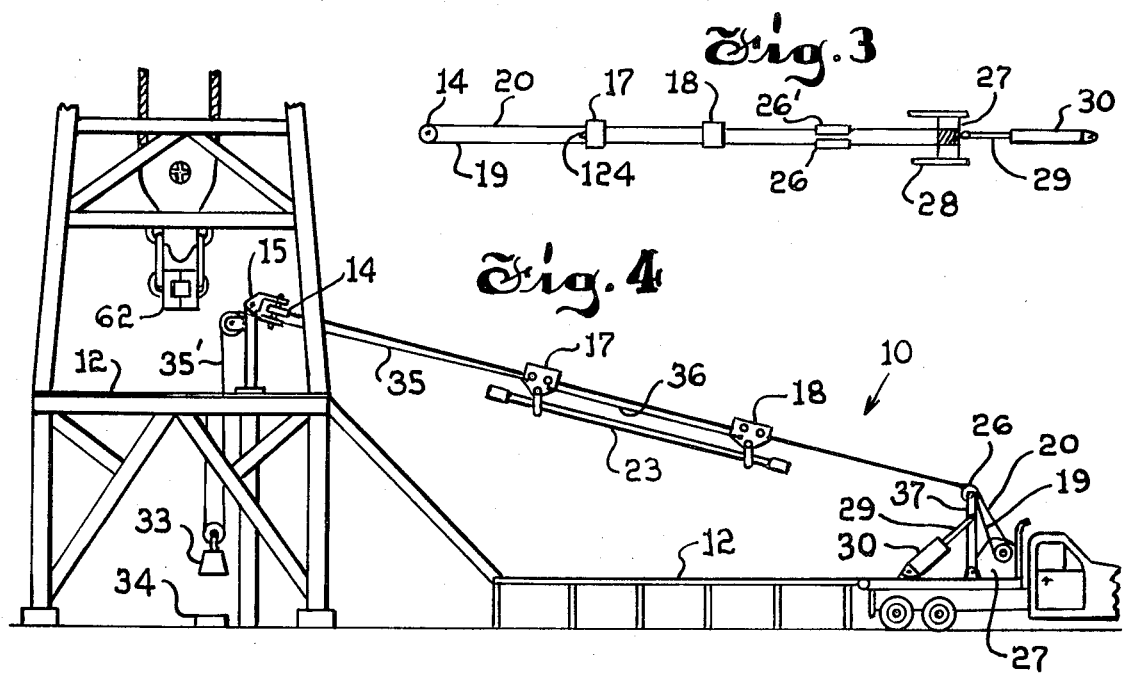

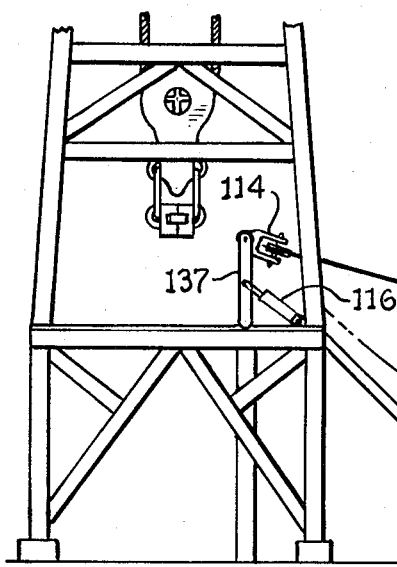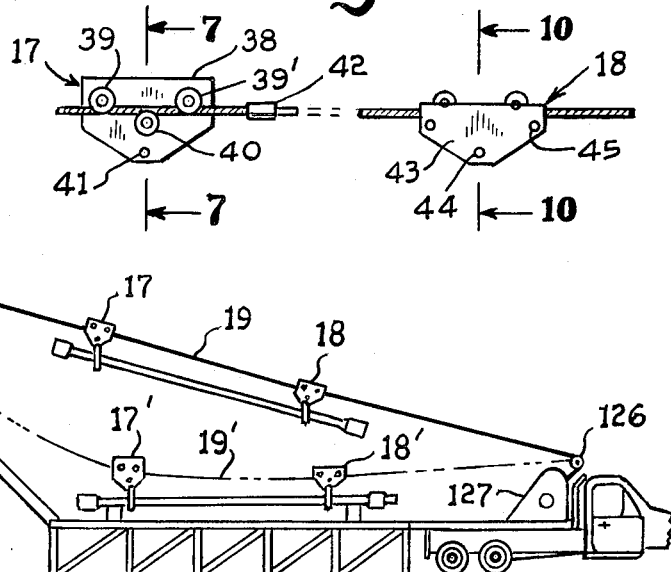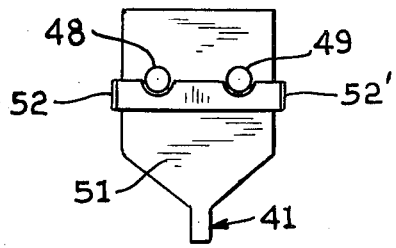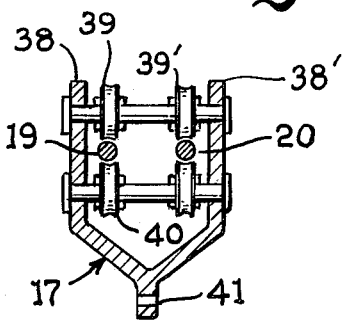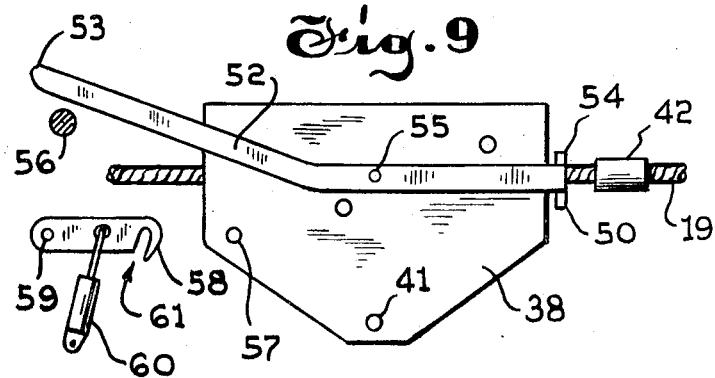

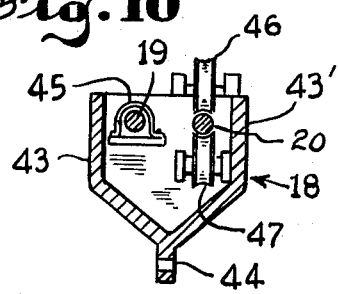
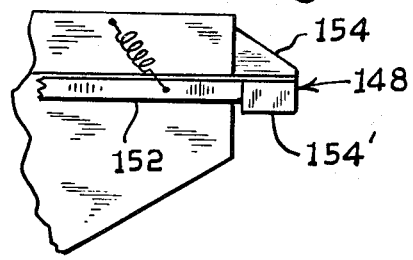
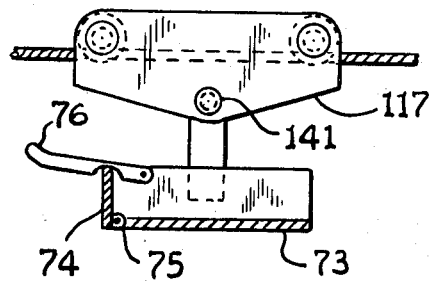
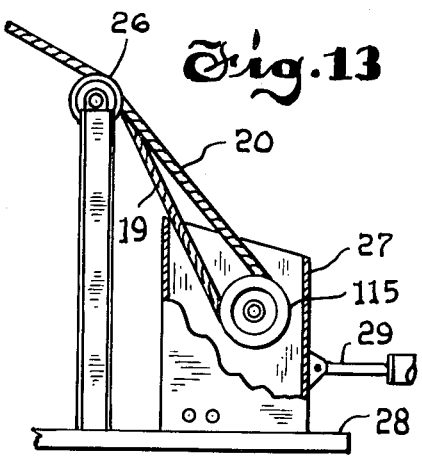
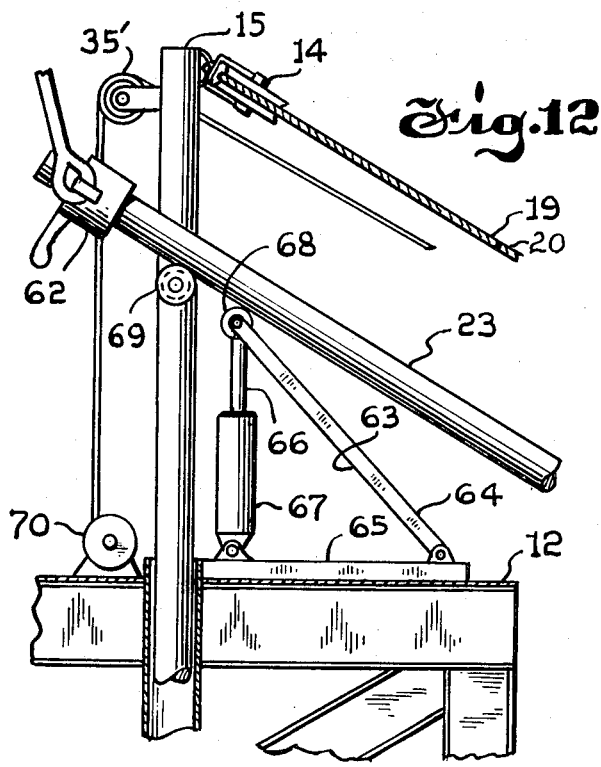
INVENTOR
DON D. BECK
BY MARCUS L. BATES
HIS AGENT

ENDLESS CABLE WAY FOR TRANSPORTING PIPE

BACKGROUND OF THE INVENTION

Reference is made to my previously filed patent application Ser. No. 17,768 filed Mar. 9, 1970, for further background of the invention. In my previous apparatus, a pilot cable was utilized for moving pipe receiving carriages along a single main cable way. The various pilot cables and other secondary cables are sometimes found to be cumbersome and often lead to complex mechanism in order to properly control the longitudinal movement of the carriages along the single main cable. Accordingly, by the present invention, the pilot cable and the drums, and the secondary cables associated with the apparatus have been eliminated so as to greatly simplify the transporting of pipe from one location to another.

SUMMARY OF THE INVENTION

This invention comprehends both method and apparatus for transporting a pipe between spaced apart locations by roving an endless cable between spaced apart cable receiving pulleys, with at least part of the length of at least one of the cable lengths being disposed in overhanging relationship with respect to one of the locations. A pipe placed within spaced apart pipe receiving carriages is transported by moving the cable longitudinally along its length. One of the carriages is directly attached to one of the cable lengths and therefore moves therewith, carrying the other carriage with it.

The tension in the cable is controlled by moving one of the pulleys towards the other so as to enable the cable to be slackened or tensioned to thereby vertically control the elevation of the carriages relative to one of the locations.

This expedient enables pipe to be placed within the pipe receiving carriages, the cable taughtened, and one of the pulleys to which the cable is attached imparted with rotational energy, thereby causing the carriages to move along the length of the endless cable.

Therefore, a primary object of this invention is the provision of an endless cable for transporting pipe from one location to another.

Another object of the present invention is to provide an endless cable having pipe receiving carriages disposed thereon which can be moved from one location to another by moving the cable longitudinally along its length.

A further object of this invention is the provision of a method of transporting tubular goods from a pipe rack to a derrick floor by disposing an endless cable upon spaced apart pulleys with a limited length of the cable being placed in close proximity of each of the locations so as to enable the movement of the cable to be utilized in transporting the pipe from one location to another.

A still further object of this invention is to disclose and provide improvements in apparatus for moving tubular goods between a pipe rack and a derrick floor.

Another and still further object of the present invention is to provide a means by which pipe receiving spaced apart carriages can be moved between a pipe rack and a derrick floor.

These and various other object and advantages of the invention will become readily apparent to those skilled in the art upon reading the following detailed description and claims and by referring to the accompanying drawings.

The above objects are attained in accordance with the present invention by the provision of a method of transporting pipe when using apparatus fabricated in a manner substantially as described in the above abstract and summary.

BRIEF DESCRIPTION OF THE DRAWINGS

FIG. 1 is a schematical representation which sets forth a side elevational view of apparatus for transporting pipe from a pipe rack to a derrick floor;

FIG. 2 is an idealized side elevational view which sets forth another embodiment of the present invention;

FIG. 3 is a partial top plan view of the apparatus seen in FIG. 2;

FIG. 4 is a detailed side elevational view of an embodiment of the apparatus made in accordance with the present invention;

FIG. 5 is similar to FIG. 4 and sets forth a modification thereof;

FIG. 6 is an enlarged fragmentary side view of part of the apparatus seen in the foregoing figures;

FIG. 7 is a cross-sectional view taken along 7—7 of FIG. 6;

FIG. 8 is a rear view of one of the carriages seen in the foregoing figures;

FIG. 9 is an enlarged modification of the carriages seen in FIG. 8;

FIG. 10 is a cross-sectional view taken along line 10—10 of FIG. 6;

FIG. 11 is a fragmentary side elevational view of a modification of the apparatus seen in FIG. 10;

FIG. 12 is an enlarged fragmentary side elevational view of part of the apparatus seen in FIGS. 1—5;

FIG. 13 is a fragmentary, part cross-sectional, side elevational view of part of the apparatus seen in FIGS. 1—5; and FIG. 14 sets forth another modification of the carriage disclosed in some of the foregoing figures.

DETAILED DESCRIPTION OF THE VARIOUS EMBODIMENTS

In FIG. 1 the arrow at numeral 10 broadly indicates apparatus for transporting pipe between spaced apart locations, as for example, an elevated derrick floor 11 and a pipe rack 12. Numeral 13 is intended to indicate structure to which part of the apparatus can be anchored.

Spaced apart cable receiving pulleys, 14 and 15, are supported from the before mentioned structure. A hydraulically actuated cylinder 16 moves pulley 15 into the dot-dashed position 15'.

Spaced apart pipe receiving carriages 17 and 18 are supported by portion 19 of an endless cable. The endless cable is rove about the spaced apart pulleys with one portion of the cable 20 remaining free of the carriages.

Cradles 21 and 22 support the opposed marginal end portion of a pipe 23. Numeral 24 broadly illustrates a deflector plate which deflects the uppermost end of the pipe from the structure which supports pulley 14.

In the embodiment of FIGS. 2 and 3, the pipe receiving carriages are seen to be supported by both longitudinally extending portions, 19 and 20, of the cable. The pulley housing 25 is attached to structure which is spaced apart from a truck 113. The two parallel portions of the cable are brought over a pair of pulleys at 26 and rove about a cable drum 27. The drum is slidably captured within or upon rails 28 so that the drums can be moved towards and away from pulleys 26 by means of the illustrated hydraulically actuated piston 29. The piston is received within a cylinder 30 in the usual manner, while structure 31 pivotally anchors the free depending end of the cylinder. A hydraulic pump 32 can be powered by means of a power take-off connected to the truck engine, if desired.

In the illustrated embodiment of FIG. 4, a biasing means in the form of a counterbalance 33 is received by platform 34 which serves as a stop means. Pilot cable 35 is rove about a pulley and continues at 35' to the counterbalance. The pilot cable is attached to the uppermost carriage 17, while a second cable 36 interconnects carriages 17 and 18.

Upstanding member 37 has spaced apart pulleys 26 attached to the free depending end thereof, with the lowermost end being pivotally attached forwardly of the cable drum. The free end of piston 29 is connected to an intermediate portion of member 37, with one end of the hydraulic cylinder 30 being pivotally attached to the bed of the truck.

In the embodiment of FIG. 5, the spaced apart pulleys 126 are secured to structure of the truck, while the pulley at 114 is attached to member 137. The lower extremity of the last named member is pivotally attached to structure of the derrick so that hydraulically actuated cylinder 116 can control the tension in the cable in a manner to permit the endless cable to assume the dot-dashed position seen at 19'.

In the embodiment of FIG. 6, the spaced apart carriages are supported by opposed portions or lengths of the endless cable. The carriage 17 is made of spaced apart plates 38 which captures rollers 39, 39' and 40 therewithin so that the rollers 39, 39' bear against and are supported by the cable, while the roller 40 maintains the cable properly positioned therebetween. Aperture 41 provides for a journaled attachment means for receiving the cradles which support the pipe.

The lower or second pipe receiving carriage is made up of spaced apart plates 43 having pins 43', 44, 45 therethrough and to which there is journaled rollers such as seen at 39 in FIG. 6. As seen illustrated in FIG. 10, one side of the carriage is affixed to one length of the cable by means of clamp 45, while the remaining side of the carriage is supported by the remaining length of the cable. The cable is received within the illustrated pulleys so that the cable length moves and supports the carriage.

Stop means 42 is in the form of an enlargement which is abuttingly received in a releasable manner by a rear wall portion of the carriage so as to selectively fix the distance between the two carriages.

In FIG. 8, apertures 48, 49 freely receive cable lengths 19 and 20 therethrough. Members 52, 52' each have a free depending end portion 53. Lateral member 54 is attached to the opposite end portion of the lever, and the lever is pivotally attached to the carriage by means of the journal formed by pin 55. Bar 56 is attached to the derrick structure and is placed in the illustrated position so as to engage the sloped underside of lever 53 when the carriage is moved into close proximity to the derrick floor.

Lateral pin 57 outwardly extends from plate 38 so that the pin bears against the curved portion 58 of member 61. Member 61 is pivotally attached to derrick structure by means of pin 59, Hydraulically actuated cylinder 60 moves the end 58 of the linkage. The illustrated slot receives pin 57 therein so as to releasably attach the carriage to the derrick structure.

In the embodiment of FIG. 11, arm 152 is attached to movable member 154', with the last named member cooperating with member 154 to form spaced apart cable receiving apertures 148 therein, in a manner similar to the embodiment disclosed in FIG. 8. Member 154' can be pivoted towards and away from member 154 so as to release the cable from therebetween.

In FIG. 12, elevators 62 are shown attached to pipe 23 so that the pipe can be pulled into axial alignment with the borehole. Linkage 63 has a lower end portion which is affixed to base plate 65 by means of journal 64. The plate pivotally receives one end of the hydraulic cylinder 67, with the opposed end of the cylinder having a piston 66 pivotally attached to roller 68. Roller 69 bottom supports the pipe to facilitate manipulation thereof.

Hydraulically actuated motor 70 has the marginal end of the before mentioned pilot cable 35 rove thereabout with the pilot cable being brought into alignment with the endless main cable by means of pulley 35'. The end of the pilot cable is attached to the uppermost carriage so as to permit the carriage to be positioned anywhere between the lowermost carriage and the uppermost main cable pulley.

In FIG. 13 there is seen the before mentioned rail 28 which forms a guide means which slidably receives the winch 27 thereon. Drum 115 receives an intermediate portion of the endless cable 19, 20. Of course, the endless cable could be mated at the drum 115 with the ends being firmly secured thereto. For the matter, the ends of the cable need not be brought together at all, as those skilled in the art understand, and such a variation is considered to fall within the comprehension of the term "endless cable."

In FIG. 14, carriage 117 has a pin 141 attached thereto for supporting cradle 73. The cradle can be curved or V-shaped, and is provided with a movable door 74 which is hinged to the cradle at 75. Latch 76 enables the door 74 to be opened when it is unfastened. The lever 76 can be actuated in a manner as set forth in my copending patent application Ser. No. 176,478 if desired.

OPERATION

In operation, an endless cable is rove between two pulleys 14 and 15, with one of the pulleys being connected to a prime mover and functioning as a cable drum so that portions 19 and 20 of the cable can be moved longitudinally along its length in a resulting manner wherein the cable 19 travels in an opposite direction relative to the cable 20. The term "endless cable" is intended to mean a cable having the ends thereof attached to a cable drum in any suitable and convenient manner, and with the intermediate portion of the cable being turned 180° and supported by one or more pulleys so that a limited length of at least one portion 19 of the cable can be disposed in overhanging relationship with respect to a first and second location 12 and 11.

The carriage 17 is free to move along cable 19 while the carriage 18 is firmly anchored thereto. Accordingly, by imparting rotational motion into the drum 15, carriage 18 will move with the cable carrying carriage 17 therewith because of the presence of the pipe 23 which essentially ties the carriages together.

Hydraulic cylinder 16 moves drum 15 into the position 15' to thereby enable the cable 19 to be lowered into the dot-dashed position 19', which places the carriage in close proximity to a pipe rack 12. Hence, those skilled in the art will now appreciate that cable 19 can be slackened so as to enable a pipe joint to be placed within the pipe receiving carriages, whereupon the cable is then tightened, the drum energized, and the pipe transported towards pulley 14.

The apparatus of FIG. 1 has the advantage of rapid vertical movement of the carriage for a limited motion of the hydraulic cylinder. The apparatus of FIG. 2 has the advantage of two cables being disposed in side by side relationship and supporting the pipe receiving carriages. This last expedient not only adds stability into the system inasmuch as two spaced apart members are supporting the carriages, but also additionally has the advantage of there being two cables for supporting the tubular goods.

In coming out of the hole, the pipe is vertically lifted by the elevators until the lower end thereof can be pushed over the roller 69 and placed within carriage 18. Drum 27 is energized so as to move the pipe towards the horizontal position until the uppermost end of the pipe drops into carriage 17. The endless cable is then moved until the pipe is transported into an overhanging position relative to the pipe rack, whereupon the hydraulic cylinder 30 is actuated so as to vertically lower both carriages until the pipe is received upon the pipe rack.

The carriages, now being free of the pipe, are vertically raised and then returned to the derrick floor by moving the endless cable along its longitudinal length. The carriage 18 will abut carriage 17, carrying the carriage therewith and eliminating the need for a pilot cable. However, it is sometime convenient to have a means by which carriage 17 can be held in close proximity of the roller 68 until a pipe is placed therewithin. Accordingly, pilot cable 35 of FIG. 4 or 12 is one means which can be employed so that carriage 17 is properly positioned while transporting pipe from the derrick floor to the pipe rack. Alternatively, the latch means 58 of FIG. 9 can be employed to maintain the uppermost carriage in proximity of the derrick floor if desired.

When going into the hole with tubular goods, it is sometime convenient to supplement the apparatus by providing a pilot cable 35 so as to position the two carriages spaced apart in the illustrated manner of FIG. 4. Alternatively, an abutment 42 can be placed on the cable 19 where deemed desirable. The abutment should be of a size which will enable it to pass through apertures 48 and under the rollers 39, but which will be releasably affixed to the member 50.

It is considered to be within the comprehension of this invention to affix carriage 17 to the cable while slidably supporting carriage 18 along the cable, and additionally tying the two carriages together by a pilot cable 36. This expedient is especially useful when transporting pipe from the rack to the floor.

I claim:

1. Method of transporting pipe between spaced apart first and second locations comprising the steps of:
    1. roving an endless cable between spaced apart cable receiving pulleys with at least part of the length of the cable being disposed in overhanging relationship with respect to the first and second spaced apart locations;
    2. supporting spaced apart pipe receiving carriages on said cable wherein one of said carriages is affixed to the cable and another of said carriages is movable relative to the cable and to said one of said carriages;
    3. controlling the tension in said cable so as to vertically position the carriages with respect to one of the spaced apart locations;
    4. moving said cable in a direction longitudinally of itself so as to cause said one of said carriages to move in a direction longitudinally of the cable; whereby:
    a pipe can be placed within the spaced apart pipe receiving carriages and transported from one to the other of said spaced apart locations.

2. Method of transporting pipe between a pipe rack and a derrick floor comprising the steps of:
    1. suspending an intermediate length of an endless cable in overhanging relationship with respect to the rack and floor;
    2. movably supporting a first pipe receiving carriage on the intermediate length of cable;
    3. attaching a second pipe receiving carriage to the cable at a location which is within said intermediate length;
    4. raising or lowering the carriages when the carriages are in overlying position respective of the rack by controlling the tension in said cable to thereby enable pipe to be received by or discharged from said carriages;
    5. moving said cable in a direction longitudinally of said intermediate length to enable a joint of pipe to be transported between the floor and rack;
    6. receiving and delivering pipe from the derrick floor by removing pipe from or placing pipe into the first and second carriages.

3. The method of claim 1 wherein the first and second carriages are each supported by two oppositely moving marginal lengths of the cable.

4. The method of claim 1 wherein the tension in the cable is controlled by elongating or shortening said intermediate length thereof.

5. The method of claim 1 wherein the first and second carriages are each supported by one of two oppositely moving marginal lengths of the cable.

6. Apparatus for transporting pipe from a derrick floor to a pipe rack, and vice versa, comprising:
    an endless cable, a pulley, a cable drum, means mounting said pulley and said drum in spaced apart relationship with said endless cable being rove about the pulley and drum so as to enable the cable to be moved relative to the pulley and drum, said means mounting said pulley and drum adapted to position said cable with at least an intermediate portion thereof being disposed in overlying relationship with respect to the rack and in close proximity of the floor;

a first pipe receiving carriage means supported by said cable, a second pipe receiving carriage means supported by said cable, one of said carriage means being affixed to said cable to move therewith; one of said carriage means being movable with respect to the cable and to the carriage means which is affixed to the cable;

means for controlling the tension in said cable to thereby control the vertical height of the carriages relative to the pipe rack; whereby:

pipe can be placed into or removed from the carriages at the rack or the floor to enable it to be transported to and from the derrick.

7. The apparatus of claim 6 wherein the endless cable forms two spaced apart oppositely moving cable lengths;

said carriages each being supported by one of said two spaced apart cable lengths.

8. The apparatus of claim 6 wherein said cable drum is provided with means by which it can be moved towards and away from said pulley to thereby control the tension in said cable.

9. The apparatus of claim 6, and further including means for moving said one of said carriage means which is movable with respect to the cable.

10. The method of claim 1 wherein the recited tension in the cable is controlled by elongating or shortening said part of the length of the cable which is disposed in overhanging relationship respective to the first and second spaced apart locations.

11. The method of claim 1 wherein step (3) is carried out by moving said spaced apart pulleys towards or away from one another.

12. The method of claim 1 wherein one of the pulleys of step (1) is in the form of a cable drum and step (3) is carried out by roving the cable over a third pair of pulleys placed intermediate of the first recited spaced apart pulleys, so that the tension in the cable as set forth in step (3) can be controlled by moving the relative position of the pulley placed intermediate of the first recited spaced apart pulleys respective to the remaining pulley and cable drum.

13. The method of claim 2 wherein step (1) is carried out by roving the endless cable about a pulley and a cable drum with the pulley being spaced apart from the cable drum, and further including carrying out step (4) by supportingly engaging the cable intermediate the pulley and the cable drum and moving said intermediate length of said endless cable toward or away from the pipe rack.

14. The method of claim 2 wherein the first and second carriages are each supported by two oppositely moving marginal lengths of the cable.

15. The method of claim 2 wherein the first and second carriages are each supported by one of two oppositely moving marginal lengths of the cable.

16. The method of claim 2 wherein controlling the tension in said cable as set forth in step (4) is carried out by roving said endless cable between spaced apart pulleys, and changing the distance between said pulleys so as to change the length of said intermediate length.

* * * * *